United States Patent [19]
Longacre et al.

[11] Patent Number: 5,189,752
[45] Date of Patent: Mar. 2, 1993

[54] TRIPLE/TWIN WIPER REPLACEMENT CARRIER AND BLADE UNIT

[76] Inventors: James R. Longacre, 3621 Littledale Rd., Kensington, Md. 20895; John M. White, 15774 Widewater Dr., Dumfries, Va. 22026

[21] Appl. No.: 844,871

[22] Filed: Mar. 3, 1992

Related U.S. Application Data

[63] Continuation of Ser. No. 647,249, Jan. 29, 1991, abandoned.

[51] Int. Cl.⁵ .............................. B60S 1/28; B60S 1/38
[52] U.S. Cl. ............................... 15/250.41; 15/250.42; 15/250.36
[58] Field of Search ........... 15/250.41, 250.42, 250.36, 15/250.35, 250.40

[56] References Cited

U.S. PATENT DOCUMENTS

| | | | |
|---|---|---|---|
| 1,441,593 | 1/1923 | Levietes | 15/250.41 |
| 1,602,457 | 10/1926 | Ritzwoller | 15/250.41 |
| 2,120,587 | 6/1938 | Zeiger | 15/250.41 |
| 2,324,365 | 7/1943 | Coutts | 15/250.41 |
| 3,631,561 | 1/1972 | Aszkenas | 15/250.41 |
| 4,057,870 | 11/1977 | Priesenuth | 15/250.41 |
| 4,339,839 | 7/1982 | Knights | 15/250.41 |
| 4,628,565 | 12/1986 | Wolters | 15/250.41 |
| 4,649,593 | 3/1987 | Gilliam, III et al. | 15/250.41 |

FOREIGN PATENT DOCUMENTS

| | | | |
|---|---|---|---|
| 105750 | 11/1938 | Australia | 15/250.41 |
| 2889589 | 8/1989 | Australia . | |
| 2705700 | 8/1978 | Fed. Rep. of Germany | 15/250.41 |
| 2933363 | 3/1981 | Fed. Rep. of Germany | 15/250.41 |
| 3134083 | 3/1983 | Fed. Rep. of Germany | 15/250.41 |
| 1366498 | 6/1964 | France | 15/250.41 |
| 2415493 | 9/1979 | France | 15/250.41 |
| 333028 | 8/1930 | United Kingdom | 15/250.41 |

*Primary Examiner*—Harvey C. Hornsby
*Assistant Examiner*—Gary Graham
*Attorney, Agent, or Firm*—Longacre & White

[57] ABSTRACT

A single triple/twin wiper replacement carrier and blade unit for a twin wiper unit having parallel extending struts interconnected by a bridge is comprised of a flexible carrier formed by at least two or three essentially parallel struts defining a longitudinal direction, a bridge structure coupling the struts to each other in an essentially parallel relationship, at least two conventional wiper blades, each of the blades extending in the longitudinal direction essentially parallel to the struts, the blades being supported by and extending downward from the carrier and means for attaching the wiper replacement carrier and blade unit to a twin wiper unit wherein each of the struts is capable of receiving each of the blades. There are attachment elements for removably attaching the carrier to a twin wiper unit. The wiper replacement carrier may either be a triple or twin wiper replacement carrier, either of which may be removably attachable to a twin wiper unit.

20 Claims, 2 Drawing Sheets

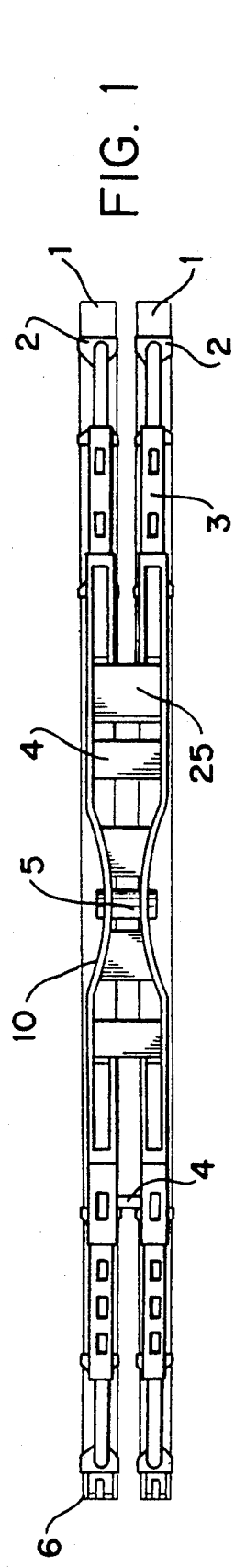
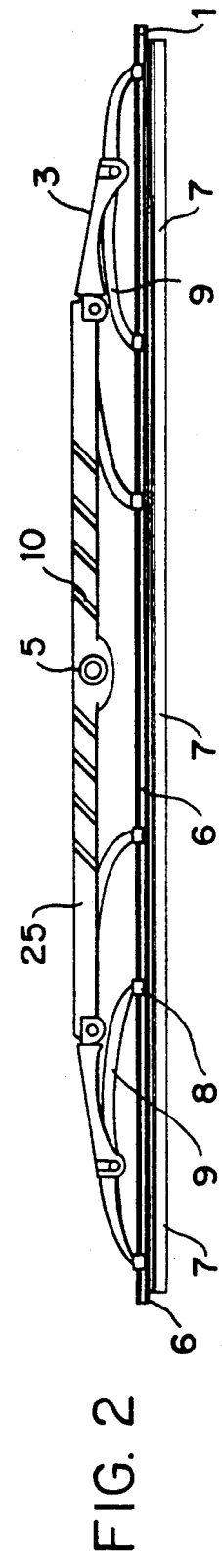
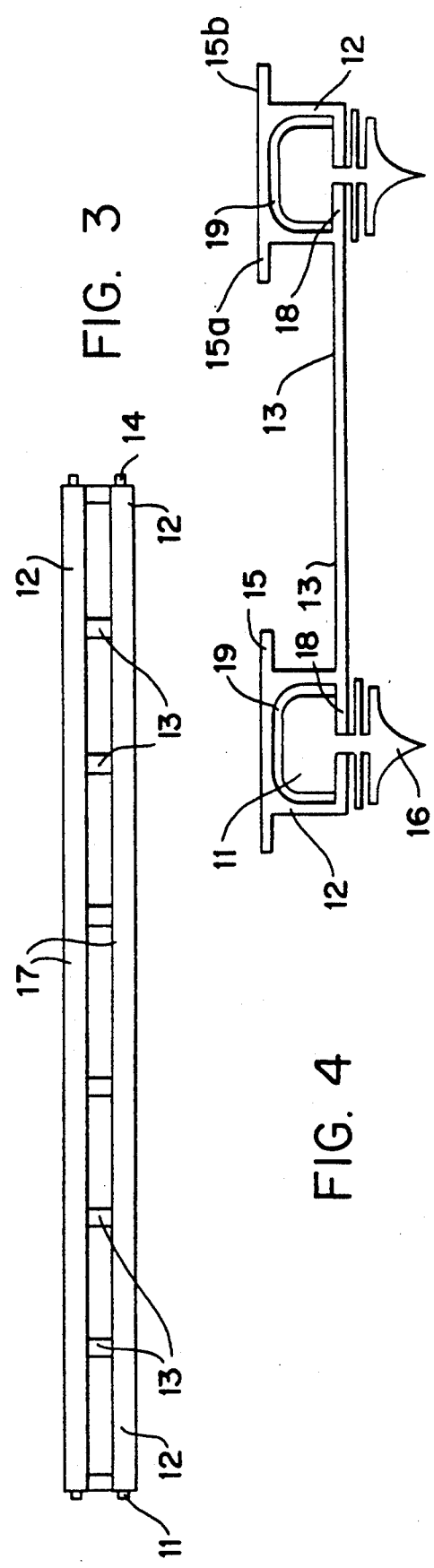

TRIPLE/TWIN WIPER REPLACEMENT CARRIER AND BLADE UNIT

This is a continuation of application Ser. No. 07/647,249, filed Jan. 29, 1991, which was abandoned upon the filing hereof.

BACKGROUND OF THE INVENTION

1. Field of the Invention

This invention concerns a single triple or twin wiper replacement carrier and blade unit for a twin wiper unit comprising a flexible carrier formed by at least two essentially parallel struts defining a longitudinal direction, a bridge structure coupling the struts to each other in an essentially parallel relationship, two or three conventional blades extending in the longitudinal direction essentially parallel to the struts and supported by and extending downward from the carrier, and with means for removably attaching the single triple or twin wiper replacement carrier and blade unit to a twin wiper unit.

2. Description of the Prior Art

Traditionally, windshield wipers for keeping automotive windshields clear have been comprised of a single blade of resilient material, such as rubber, which is removably mounted in an arm. However, in recent years so called "twin wipers" have become popular. These kinds of wipers employ two blades which are mounted in parallel by a holder formed of a pair of parallel struts, a bridge coupling the struts, and two separate removable blades, which are identical to the blades used on conventional single blade wipers.

These twin wipers, which provide enhanced performance as well as having a distinctive "look", have been very successful. On the one hand the ability to replace the blades in twin wipers with conventional blades was convenient, particularly when twin wipers were new to the market, and insufficient demand existed for a replacement which could only be used on twin wipers. On the other hand, the unique nature of the twin wiper calls for a unique replacement which can enhance the performance and characteristics of twin wipers. Furthermore, a clear need exists for a unitary "replacement" which can also be supplied originally or not as the seller may elect.

A further development has been the so called triple wiper in which three blades can successively wipe the glass, again improving performance. In the most popular form the three blades extend from a single holder portion which is unitary and of the same material as the blades. While very popular, the blade is not readily adaptable to a twin wiper. Thus, the consumer is forced to choose between the benefits and look of a twin wiper or that of a triple wiper; he or she cannot have both.

A clear need exists for a way in which the characteristics, appearance and performance of the twin wiper can be enhanced. A separate need exists for an arrangement whereby a triple blade can be used on a conventional twin wiper.

Various wipers have been developed over the years which, while not satisfying the needs stated above, are worth reviewing to better understand the technical background from which the present invention has come.

U.S. Design Pat. No. 28,990 (CUMMING) concerns a design for a window cleaner in which a rubber filling between segmented plates of a long handled window cleaner fits between two concentric segmental plates such that both ends of the rubber filling are exposed to the window, giving a twin wiper effect. This design is not for an automobile windshield wiper but is instead for a manual window cleaner.

U.S. Pat. No. 1,370,910 (PEDERSON) is for a windshield cleaner consisting of a wiper bar of resilient material, bent backwardly at approximately right angles to provide channels for wiper strips, the outer walls of the channels terminating at about the line of the body of the wiper bar. The wiper strips are composed of any material. After the wiper strips are inserted in their channels, the side walls of the channels are pressed toward each other to effectually grip the wiper strips in position. This windshield cleaner is heavy and clumsy and does not possess individual struts, connected by bridges, which have blades extending downwardly from the struts, nor does it provide means for attaching to a twin wiper unit as a replacement for the worn out blades of the wiper unit.

U.S. Pat. No. 1,441,593 (LAVIETES) is a windshield cleaner of the type shown and described in U.S. Pat. No. 1,370,909 (PEDERSON).

U.S. Pat. No. 1,940,329 (SHIERK) is for a squeegee for windshield wipers, and consists of a sheet of rubber with a corrugated portion, bent back on itself with the ends of the rubber sheet secured in a holder having substantially parallel surfaces, each of the side walls of the legs of the holder having projections extending inwardly from the inner surface for engaging the squeegee.

Australian Patent No. 105,750 (WHATMORE) is for a windshield wiper which has a plurality —as two or three or more— of parallel arms or holders spaced apart and each edged with one or more thin sheets of rubber or similar flexible material. Distance pieces and rivets function to space apart two identically formed wiper blade holders of channelled metal formation. Each holder has secured within its channel an edge of a strip of suitably formed flexible material such as rubber, forming a wiper blade. The holders are secured by a bridge piece which in turn has a central upright projection which is longitudinally holed and forms a connecting element whereby the two-bladed wiper unit may be loosely fitted to the end of the wiper arm. This device can not be used as a replacement wiper unit for a twin wiper unit as there are no means for attaching this unit to an existing twin wiper unit. Additionally, the wiper holders are not flexible.

U.S. Pat. No. 2,324,365 (COUTTS) is a windshield wiper in which a single sheet of metal is folded longitudinally to provide a bridge and sidewalls extending from opposite sides of the bridge and constituting blades over which can be fitted rubber shoes. This device can not be used as a replacement or refill unit for a twin wiper unit.

U.S. Pat. No 3,224,027 (OISHEI) is for a twin lipped wiper blade using double-ply construction. Neither this device nor the U.S. Pat. No. 2,324,365 is designed for a single replacement unit of the blades of a twin wiper unit.

Australian Patent Document No. 28895/89 is for a wiper refill which comprises a backing member and a blade arrangement including at least two wiping flares adapted to coact and a base arrangement including attachment means constructed and arranged for attaching the blade arrangement to the backing member. Each wiping flare may be adjacent to one another such that when in use there is defined a tubular space or void between adjacent wiping flares and the surface to be wiped. This device differs from the present invention as Australian Patent No. 3,224,027 is designed solely as a replacement for a single wiper blade.

U.S. Pat. No. 4,317,251 (PRIESEMUTH) is for a windshield wiper having two strips of rubber-like material mounted in a separate holder, one on each side of the actual wiper blade, to store and distribute a cleaning fluid over the windshield surface. This blade cannot be used as a replacement for a twin wiper unit, nor does it have the bridge and strut arrangement of the invention.

U.S. Pat. No. 4,339,839 (KNIGHTS) is for a windshield wiper comprising a carrier adapted for mounting on a windscreen wiper arm and for supporting a pair of spaced parallel wiping lips. The blade carrier has two side members and a cross member and each side member at its base may have an inwardly directed flange adapted to be accommodated in a longitudinal groove formed in a side of a blade assembly comprising the two lips and a cross member in which the device may be mounted. This device can not be used as a replacement for a twin wiper unit, nor are there struts connected by a bridge from which the blades extend downward.

U.S. Pat. No. 4,628,565 (WOLTERS) is for a windscreen wiper with at least two wiper blades. The windscreen wiper is comprised of two wiper blades and a bridge structure for coupling the wiper blades. The bridge structure is a light weight low-profiled structure and comprises two longitudinal bars which run parallel to and in the longitudinal direction of the wiper blades and are designed uncurved with respect to the wiper blades and connected to each other by cross connecting webs. While this device is an improvement over previous wiper blades systems, the wiper blade arrangement still lacks rigidity. Additionally, when the wiper blades of this device become worn or otherwise need replacing, it is necessary to carry out two operations to remove or replace both worn out blades.

SUMMARY OF THE INVENTION

This invention is a unique single triple/twin replacement carrier and blade unit for a twin wiper unit. The twin wiper replacement carrier and blade unit is comprised of a flexible carrier formed by at least two essentially parallel struts defining a longitudinal direction. A bridge structure couples the struts to each other in an essentially parallel relationship. At least two conventional blades extend in the longitudinal direction essentially parallel to the struts with the blades being supported by and extending downward from the carrier. The twin wiper replacement carrier and blade unit can be removably attached to a twin wiper unit, wherein each of the struts is capable of receiving each of the blades.

The blades may be comprised of rubber, neoprene, nylon, plastic, and natural and synthetic fibers. The bridge structure is comprised of a series of bridges connected between blade supporting struts with the ends of each bridge connecting to a different strut at predetermined intervals. The blades may be attached to the struts by an adhesive, or the struts may have a slot along their bottom edge for receiving a blade. The bridges are resilient, allowing for the mounting of the single twin wiper replacement carrier and blade unit on any sized existing twin wiper unit. The twin wiper replacement carrier is composed of plastic. The means of attaching the replacement carrier and blade unit includes means of slidably fitting the replacement unit on a twin wiper unit. The struts can also have a slot therein along a bottom edge for receiving a squeegee member.

In another version of the invention the replacement unit is formed of at least three essentially parallel struts defining a longitudinal direction, a bridge structure means coupling the struts, and at least three conventional blades, each extending in the longitudinal direction essentially parallel to the struts. In yet a further embodiment, a single blade having more than one tip extends across the width of the replacement unit, attaching at each of the outer struts.

Also as described above, the blades are supported by and extend downward from the carrier, and each of the struts is capable of receiving each of the blades. One design for removably attaching the single triple carrier and blade unit is to removably attach the single triple carrier unit to the twin wiper unit by removably attaching the two outer struts of the carrier to the twin wiper unit.

The present invention allows for the quick easy replacement of both wiper blades of U.S. Pat. No. 4,628,565 in one operation. There are a number of other advantages to the present invention. By having a single twin wiper replacement carrier and blade unit for a twin wiper unit, the sturdiness and rigidity of the entire blade unit is increased, allowing for a more efficient cleaning of the windshield. This replacement carrier and blade unit, by design, has a more substantive look and feel than mere single replacement blades. The increased rigidity of this wiper replacement carrier and blade unit greatly decreases any vibration of the twin wiper unit upon which it is mounted. Also a triple wiper replacement carrier and blade unit can be installed on a twin wiper unit, thus effectively converting the twin wiper unit to a triple wiper unit.

BRIEF DESCRIPTION OF THE DRAWINGS

Other and further objects of the present invention will be apparent from the following description and claims and are illustrated in the accompanying drawings, which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the and the scope of the appended claims.

FIG. 1 is an top view of a windshield wiper with at least two wiper blades.

FIG. 2 is a cross sectional view of a windshield wiper with at least two wiper blades.

FIG. 3 is a top view of a twin wiper replacement carrier and blade unit.

FIG. 4 is a front view of a twin wiper replacement carrier and blade unit.

Figure 5:
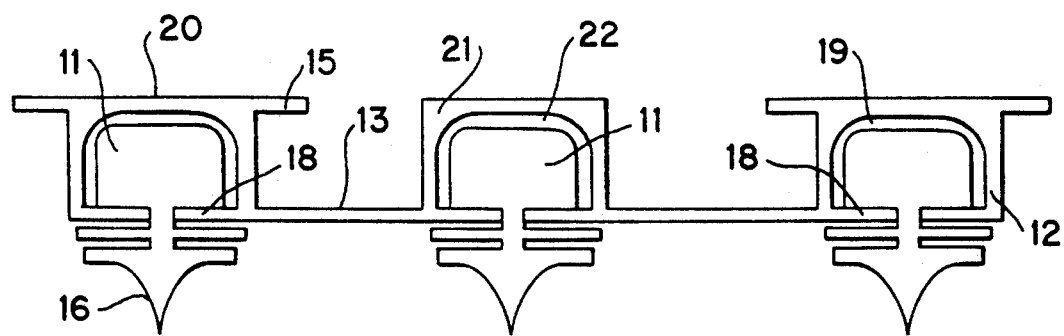
FIG. 5 is a front view of a triple/twin wiper replacement carrier and blade unit with three struts.

The triple/twin or twin wiper replacement units shown in FIGS. 3–7 are designed to fit on any sized twin wiper.

DETAILED DESCRIPTION OF THE DRAWINGS

The twin wiper unit 10 is typically comprised of two wiper blades 7 mounted in parallel by a holder 25. The holder 25 is formed by a pair of struts 6 to which the blades 7 are attached. The struts 6 are slidably attached to lever systems 3 and 9. A series of bridges 4 couple the lever systems 3 and 9 and, in turn, the struts 6 and blades 7.

The single twin wiper replacement carrier and blade unit of the present invention for a twin wiper unit is comprised of a flexible carrier 17 formed by at least two essentially parallel struts 12 defining a longitudinal direction, and a bridge structure means 13 coupling the struts to each other in an essentially parallel relationship. The carrier is flexible to allow for the ease of attachment to the twin wiper unit 10, and to allow for the twin wiper replacement carrier and blade unit to conform to the contour of the window when it is positioned between the windshield and attached to the twin wiper unit 10 which is itself attached at a certain point 5 to a wiper arm (not shown). This allows for better surface contact between the windshield and the tip 16 of the wiper blade 11.

The bridge structure means is comprised of a series of bridges 13 with each bridge running between the struts 12. Each end of each bridge is connected to a different strut 12 at predetermined intervals. In an alternative embodiment, the bridges 13 cross-link the struts 12.

Figure 6:
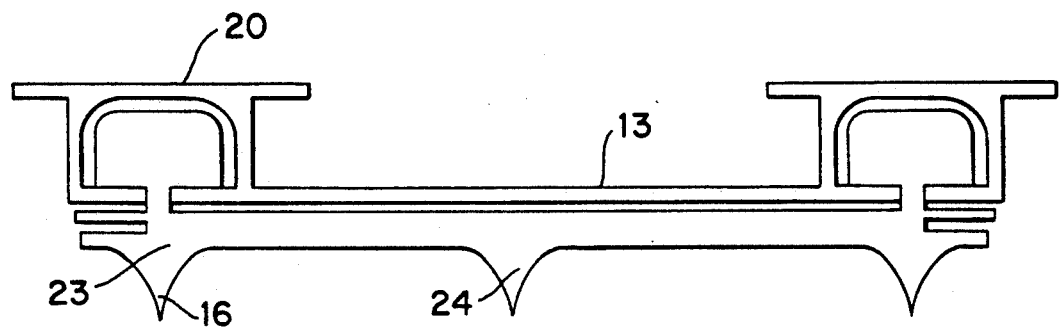
FIG. 6 is a front view of a triple/twin wiper replacement carrier and blade unit with a multi-pronged blade.
Figure 7:
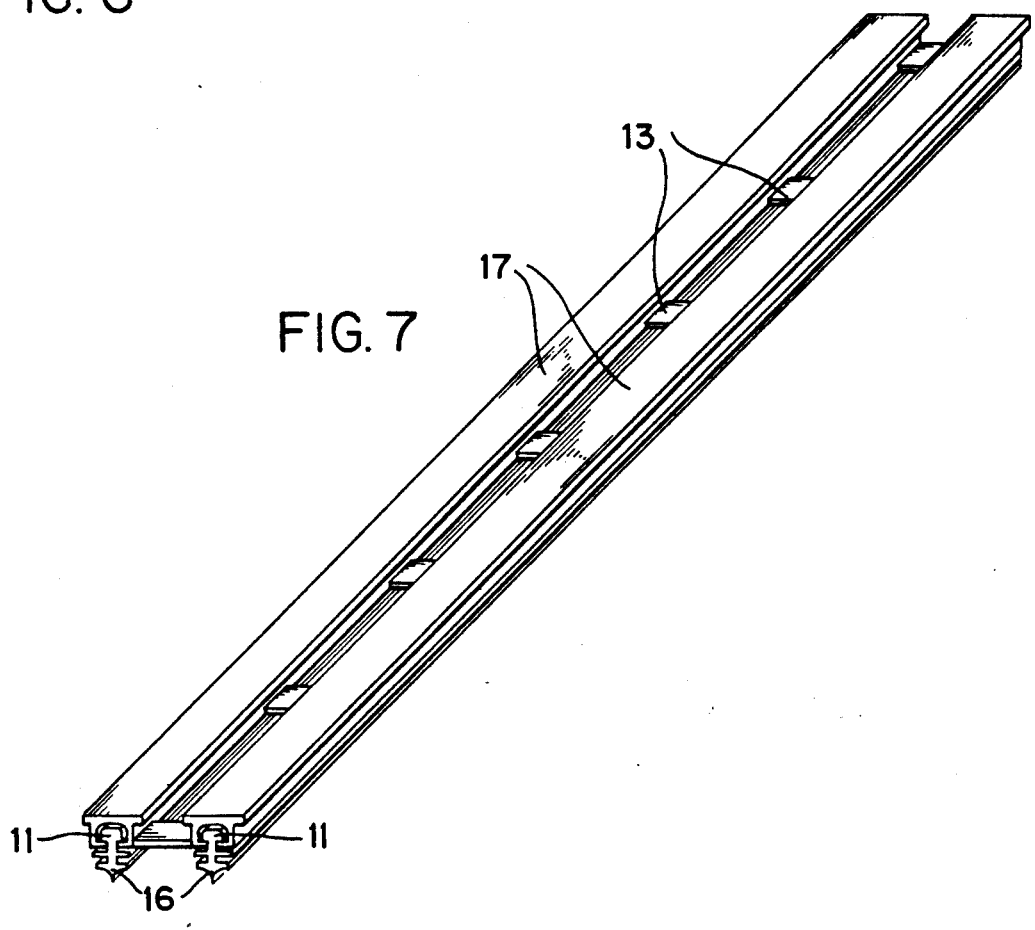
FIG. 7 is a perspective view of a twin wiper replacement carrier and blade unit.

FIGS. 4 through 6 show the relationship between the bridge 13 and the struts 12. The top part 11 of the outer struts 12 attach to the twin wiper unit 10. This attachment is accomplished by two tangs 15a and 15b, located, on each strut and extending opposite each other. The tangs slidingly cooperate with the corresponding fittings on the twin wiper unit. The inside bottom part of the strut 18 extends into a bridge structure 13 whose ends connect to the other strut 12. The bridge 13 and strut 12 may be molded as one unit.

The bridges 13 themselves are resilient to allow for the mounting of the twin wiper replacement carrier and blade unit on to any size existing twin wiper unit 10. The carrier 17 can be slidably attached onto a twin wiper unit 10. The carrier 17 can be made of metal or preferably plastic.

At least two conventional blades 11 extend in the longitudinal direction parallel to the struts 12. The blades ii are supported by and extend downwardly from the carrier 17. The blades 11 may be made from rubber, neoprene, nylon, plastic, natural and synthetic fibers, Or any combination thereof. The blades 11 may be attached to the struts 12 by means of an adhesive, or, in a preferred embodiment, each of the struts 12 has a slot 19 along its bottom edge for receiving a blade 11.

Another embodiment of this invention is a single triple wiper replacement carrier and blade unit for a twin wiper unit 10. This device allows for the instant conversion of the twin wiper unit 10 to a triple wiper unit 20 by merely replacing the wiper blades 11 of the twin wiper unit with a single triple wiper replacement unit as shown in FIGS. 5 and 6.

One embodiment of the single triple wiper replacement carrier and blade unit 20 has a third strut 21 positioned between the outer struts 12. The third or middle strut 21 is connected to the outer struts 12 by means of the bridges 13. A blade 11 is either attached to the third or middle strut 21 by means of an adhesive or the strut 21 has a slot along a bottom edge 22 for receiving a blade 11.

Another embodiment of the single triple wiper replacement carrier and blade unit has a replacement carrier that is similar to that described above for the twin wiper replacement carrier but has a wide single blade 23 which extends across the width of the carrier 17, and attaches to the struts as did the regular single blades 11. Beneath the two each of the two struts is a tip 16 of the blade 23. Between these two tips lies at least one, and possibly several middle blade tips 24, which can aid in the cleaning and drying of the windshield.

To attach either the single triple wiper replacement carrier and blade unit or the single twin wiper replacement unit to a twin wiper unit having parallel extending struts interconnected by a bridge, the service station attendant or the windshield wiper owner removes the wiper blade clips 1 from the cams 2 holding the original struts 6 and wiper blades 7 to the twin wiper unit 10. The original and worn out struts 6 and wiper blades 7 are slid out from the grippers 8 that were holding the struts in place. The single twin or triple wiper replacement carrier and blade unit may then be attached to the twin wiper unit by slipping the top part 15 of the outer struts 12 through the grippers. This is made easier by pre-positioning (aligning) the lever systems 3 and 9. After sliding the carrier 17 into position, refill clips 14 are then inserted into the cams 1, thereby securing the replacement carrier and blade unit to twin wiper unit 10.

What is claimed is:

1. A single replacement unit for a twin blade windshield wiper holder, said holder including a plurality of lever systems adapted to bias separate wiper blades against a windshield of a vehicle, the lever systems defining two groups of a plurality of spaced parallel grippers adapted to slidably receive and retain said separate wiper blades, said replacement unit comprising:
   a flexible carrier having a plurality of elongated struts and bridge structure means for coupling said struts together substantially parallel to each other;
   a plurality of elongated wiper blades extending along, and secured to said struts; and
   mounting means for connecting said flexible carrier to said wiper holder including a pair of oppositely extending tangs protruding from two of said elongated struts, each of said pair of oppositely extending tangs adapted to be slidably received by one of said groups of grippers.

2. A single replacement unit according to claim 1, wherein said blades are comprised of rubber.

3. A single replacement unit according to claim 1, wherein said blades are comprised of the material selected from the group consisting of neoprene, nylon, plastic, and natural and synthetic fibers.

4. A single replacement unit according to claim 1, wherein said bridge structure means comprises a plurality of bridges spanning between and connecting said struts.

5. A single replacement unit according to claim 1, wherein said bridge structure means is resilient to permit a variable distance between said struts.

6. A single replacement unit according to claim 1, wherein said blades are attached to said struts by an adhesive.

7. A single replacement unit according to claim 1, wherein said blades are attached to said struts by means of tongues on said blades cooperating with slots on said struts.

8. A single replacement unit according to claim 1, wherein said carrier is composed of plastic.

9. A single replacement unit for a twin blade windshield wiper holder, said holder including a plurality of lever systems adapted to bias separate wiper blades against a windshield of a vehicle, the lever systems defining two groups of a plurality of spaced parallel grippers adapted to slidably receive and retain said separate wiper blades, said replacement unit comprising:
- a flexible carrier having a plurality of elongated struts and bridge structure means for coupling said struts substantially parallel to each other;
- a single wiper blade having a plurality of elongated wiper tips contacting said windshield, said wiper tips are integral with said single wiper blade, said single wiper blade spanning between and secured to said struts;
- mounting means for connecting said flexible carrier to said wiper holder including a pair of oppositely extending tangs protruding from two of said elongated struts, each of said pair of oppositely extending tangs adapted to be slidably received by one of said groups of grippers.

10. A single twin wiper replacement carrier for a twin blade windshield wiper holder, said holder including a plurality of lever systems adapted to bias separate wiper blades against a windshield of a vehicle, the lever systems defining two groups of a plurality of spaced parallel grippers adapted to slidably receive and retain said separate wiper blades, said replacement carrier comprising:
- a plurality of elongated struts;
- bridge structure means for coupling said struts together substantially parallel to each other; and
- mounting means for connecting said carrier to said wiper holder including a pair of oppositely extending tangs protruding from two of said elongated struts, each of said pairs of oppositely extending tangs adapted to be slidably received by one of said groups of grippers.

11. A single twin wiper replacement carrier according to claim 10, wherein said carrier is composed of plastic.

12. A single twin wiper replacement carrier according to claim 10, wherein said bridge structure means comprises a plurality of bridges spanning between and connecting said struts.

13. A single replacement unit for a twin blade windshield wiper holder, said holder including a plurality of lever systems adapted to bias separate wiper blades against a windshield of a vehicle, the sever systems defining two groups of a plurality of spaced parallel grippers adapted to slidably receive and retain said separate wiper blades, said replacement unit comprising:
- a flexible carrier having at least three elongated struts and bridge structure means for coupling said struts together substantially parallel to each other;
- at least three elongated wiper blades extending along and secured to said struts;
- mounting means for connecting said flexible carrier to said wiper holder including a pair of oppositely extending tangs protruding from two of said elongated struts, each of said pair of oppositely extending tangs adapted to be slidably received by one of said groups of grippers.

14. A single replacement unit according to claim 13, wherein said blades are comprised of rubber.

15. A single replacement unit according to claim 13, wherein said blades are comprised of the material selected from the group consisting of neoprene, nylon, plastic and natural and synthetic fibers.

16. A single replacement unit according to claim 13, wherein said blades are attached to said struts by an adhesive.

17. A single replacement unit according to claim 13, wherein said blades are attached to said struts by means of tongues on said blades cooperating with slots on said struts.

18. A single replacement unit according to claim 13, wherein said bridge structure means comprises a plurality of bridges spanning between and connecting said struts, and each of said plurality of bridges is resilient to permit a variable distance between said struts.

19. A single replacement unit according to claim 13, wherein said carrier is composed of plastic.

20. A single triple wiper replacement carrier for a twin blade windshield wiper holder, said holder including a plurality of lever systems adapted to bias separate wiper blades against a windshield of a vehicle, the lever systems defining two groups of a plurality of spaced parallel grippers adapted to slidably receive and retain said separate wiper blades, said replacement carrier comprising:
- at least three elongated struts;
- bridge structure means for coupling said struts together substantially parallel to each other; and
- mounting means for connecting said carrier to said wiper holder including a pair of oppositely extending tangs protruding from two of said elongated struts, each of said pair of oppositely extending tangs adapted to be slidably received by one of said groups of grippers.

* * * * *